(12) United States Patent
Spiridigliozzi (10) Patent No.: US 11,523,197 B2
(45) Date of Patent: Dec. 6, 2022

(54) SOUND GENERATING DEVICE (71) Applicant: Shari Spiridigliozzi, Netcong, NJ (US)

(72) Inventor: Shari Spiridigliozzi, Netcong, NJ (US)

(*) Notice: Subject to any disclaimer, the term of this patent is extended or adjusted under 35 U.S.C. 154(b) by 258 days.

(21) Appl. No.: 16/895,429

(22) Filed: Jun. 8, 2020

(65) Prior Publication Data
US 2020/0389715 A1 Dec. 10, 2020

Related U.S. Application Data (60) Provisional application No. 62/858,193, filed on Jun. 6, 2019.

(51) Int. Cl.
| | |
|---|---|
| *H04R 1/02* | (2006.01) |
| *H02J 7/00* | (2006.01) |
| *A63F 3/00* | (2006.01) |
| *A63H 17/26* | (2006.01) |
| *H02J 7/35* | (2006.01) |
| *A63H 5/00* | (2006.01) |
| *A63H 27/00* | (2006.01) |
| *A63H 3/28* | (2006.01) |

(52) U.S. Cl.
CPC .......... *H04R 1/028* (2013.01); *A63F 3/00697* (2013.01); *A63F 2003/00845* (2013.01); *A63H 3/28* (2013.01); *A63H 5/00* (2013.01); *A63H 17/268* (2013.01); *A63H 27/00* (2013.01); *H02J 7/0045* (2013.01); *H02J 7/35* (2013.01)

(58) Field of Classification Search
CPC . H04R 1/028; H04R 1/02; A63F 2003/00845; A63F 3/00697; A63F 3/00; A63H 3/28; A63H 5/00; A63H 17/268; A63H 27/00; A63H 17/26; H02J 7/0045; H02J 7/35; H02J 7/00
See application file for complete search history.

(56) References Cited

U.S. PATENT DOCUMENTS

2019/0335714 A1* 11/2019 Sweetnam ........... A01K 15/025

* cited by examiner

*Primary Examiner* — Robert L Deberadinis
(74) *Attorney, Agent, or Firm* — Benjamin Appelbaum (57) ABSTRACT

A sound generating device comprises top, bottom and sound generating assemblies. The sound generating assembly comprises a microprocessor, sound chip, capacitor, speaker and power source that are electrically interconnected. The sound can range from animal and/or environmental sounds, music, congratulatory messages, other types of voice recordings, bells, whistles and the like, and the length of play can be varied. When the device is struck against a hard surface, the contact in the top is depressed and interacts with a receptor on the sound generating device to communicate with the microprocessor and sound chip to generate a sound, which can persist from about one or more seconds, depending on how the sound generating device had been programmed. Repeat strikes of the sound generating device against the surface will result in a repetition of the sound.

20 Claims, 7 Drawing Sheets

SOUND GENERATING DEVICE

CROSS-REFERENCE TO RELATED APPLICATIONS

This application claims the benefit of U.S. Provisional Application for Patent Ser. No. 62/858,193, filed 6 Jun. 2019, by the present inventor, and whose contents are hereby incorporated by reference herein in their entirety.

FIELD OF THE INVENTION

Embodiments of the present invention relate to a sound generating device, which can be used either alone, or in conjunction with an item such as a toy, a game piece, a model soldier and the like, and contains a sound module that plays a recorded sound when the device is struck against a surface, for example, a chess board. The sound can be any sound selected by the manufacturer of the sound generating device, and can range from animal and/or environmental sounds, music, congratulatory messages, other types of voice recordings, bells, whistles, aircraft, trains and the like.

BACKGROUND OF THE INVENTION

In recent years, greeting cards have been sold that contain sound modules which can play back a recorded sound when the card is opened. Often, the recorded sound is a message such as "Happy Birthday", "Happy Anniversary", or other type of congratulatory message. More recently, the card manufacturers have sold cards in which the purchaser can make their own recording onto the card for playback of a personalized message when the recipient opens the card.

Manufacturers have started placing sound modules into other products, such as for gift items or for promotional items, such that when the package containing the item is opened, the sound played back may announce that the user has won something, plays a congratulatory message, or otherwise tries to call the attention of others to the recipient in order to promote the manufacturer's product.

In contrast, (non-video) game play is generally a quiet activity, with most noise coming from the players between moves, during conversation or breaks in the game play, with no sound generally coming from any of the game pieces. While such game play can be considered as pleasant, the generation of sound from one or more of the game pieces could add to the entertainment value, or add further interest to a player, when used in conjunction with the game.

As an example, in a chess game, a piece such as the knight could produce the sound of a horse when the knight's move is completed, or a pawn state "you're captured". A checker could produce "king me" or a similar sound when the checker advances across the board to other sides and can be crowned a king. Fantasy type game pieces can generate sounds such as that of a dragon, an owl, gorilla or other animal or the like when the device is struck against a hard surface, for example, a chess board. The sound can be any sound selected by the manufacturer of the sound generating device, and can range from animal and/or environmental sounds, music, congratulatory messages, other types of voice recordings, bells, whistles and the like.

BRIEF SUMMARY OF THE INVENTION

An object of the present invention is to provide a sound generating device in which the recorded sound can be customized to the requirements of the user.

Another object of the present invention is to provide a sound generating device in which a contact-activated sensor will cause a sound module to play back a recorded sound when the sound generating device is struck against a hard surface.

Embodiments of the present invention provide a sound generating device that comprises a top and sidewall, (forming a housing assembly), a bottom (a bottom assembly) and a sound generating assembly. The sound generating assembly comprises a microprocessor, sound chip, capacitor, speaker and power source that are electrically interconnected. The sound can range from animal and/or environmental sounds, music, congratulatory messages, other types of voice recordings, bells, whistles and the like, and the length of play can be varied. In one embodiment, a contact within the device top, when compressed, either by a user or by a game piece mounted atop the sound generating device, will actuate the microprocessor to communicate with the sound chip to generate a sound, which can persist for about one or more seconds, depending on how the sound generating device has been programmed. Repeat strikes of the sound generating device against the surface will result in a repetition of the sound.

BRIEF DESCRIPTION OF THE SEVERAL VIEWS OF THE DRAWING

FIGS. 3A and 3B are a view of assemblies of the embodiment shown in FIG. 1;

DETAILED DESCRIPTION OF THE INVENTION

Figure 1:
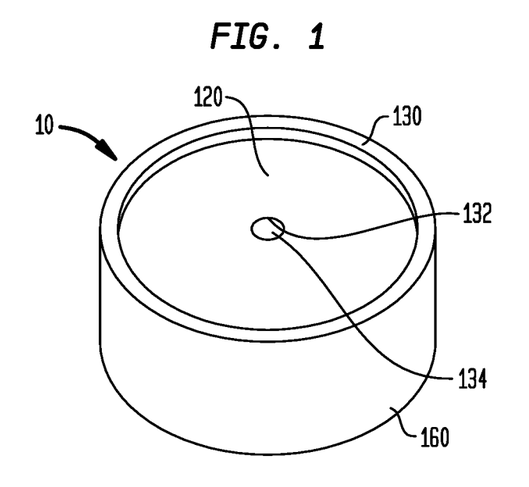
FIG. 1 is a top plan view of an embodiment of the present invention.
Figure 2:
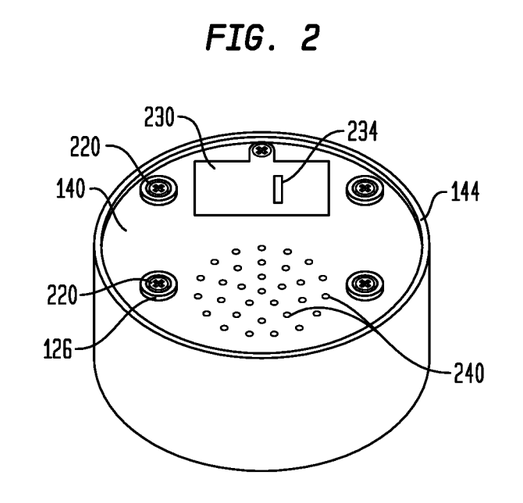
FIG. 2 is a bottom plan view of the embodiment shown in FIG. 1.

An embodiment of the sound generating device 10, is shown in FIGS. 1-2. The sound generating device 10 comprises a top 120, bottom 140 and sidewall 160. The top contains an inner surface 122 and outer surface 124; the bottom includes a inside surface 142 and an outside surface 144, the top 120 and bottom 140 being interconnected by sidewall 160.

Figure 3A:
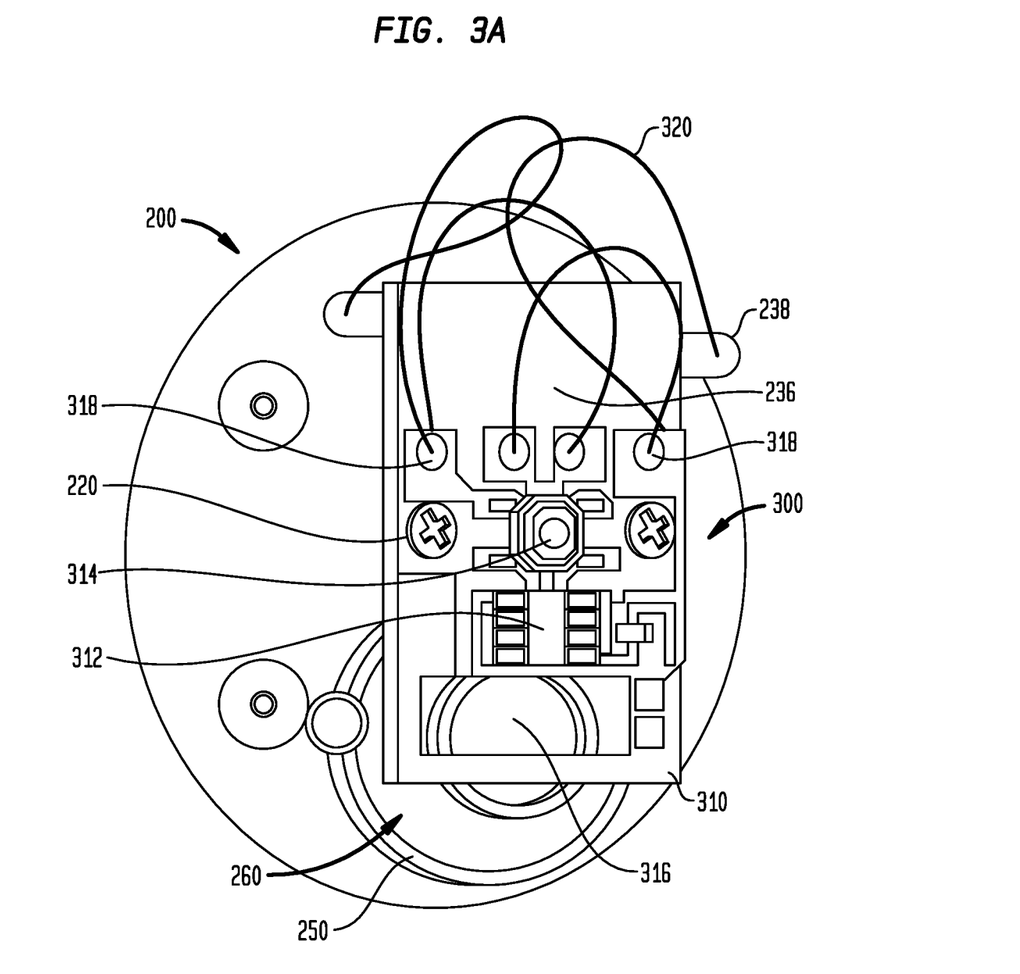
FIG. 3A illustrates the bottom assembly and the sound generating assembly.
Figure 3B:
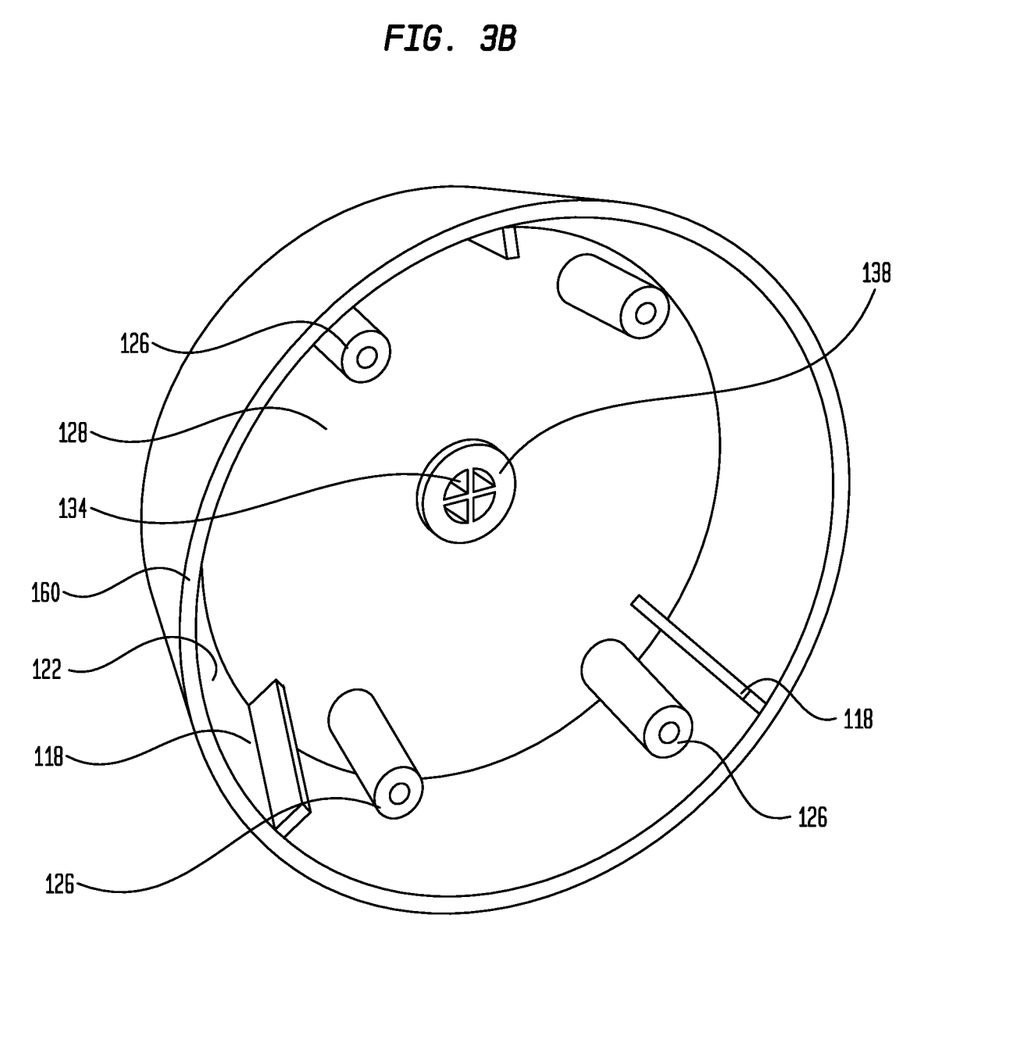
FIG. 3B illustrates the top and side assembly.
Figure 4:
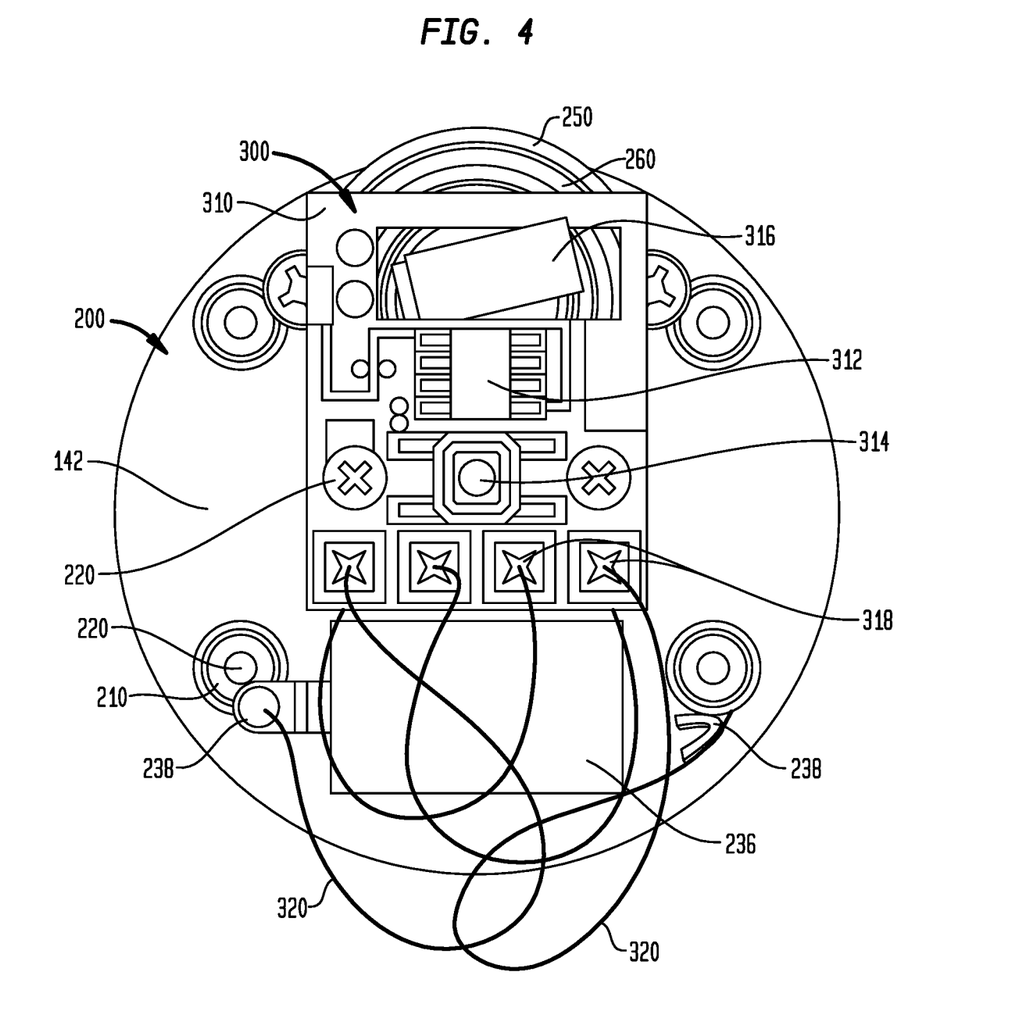
FIG. 4 is a top view of the bottom assembly and the sound generating assembly.
Figure 5:
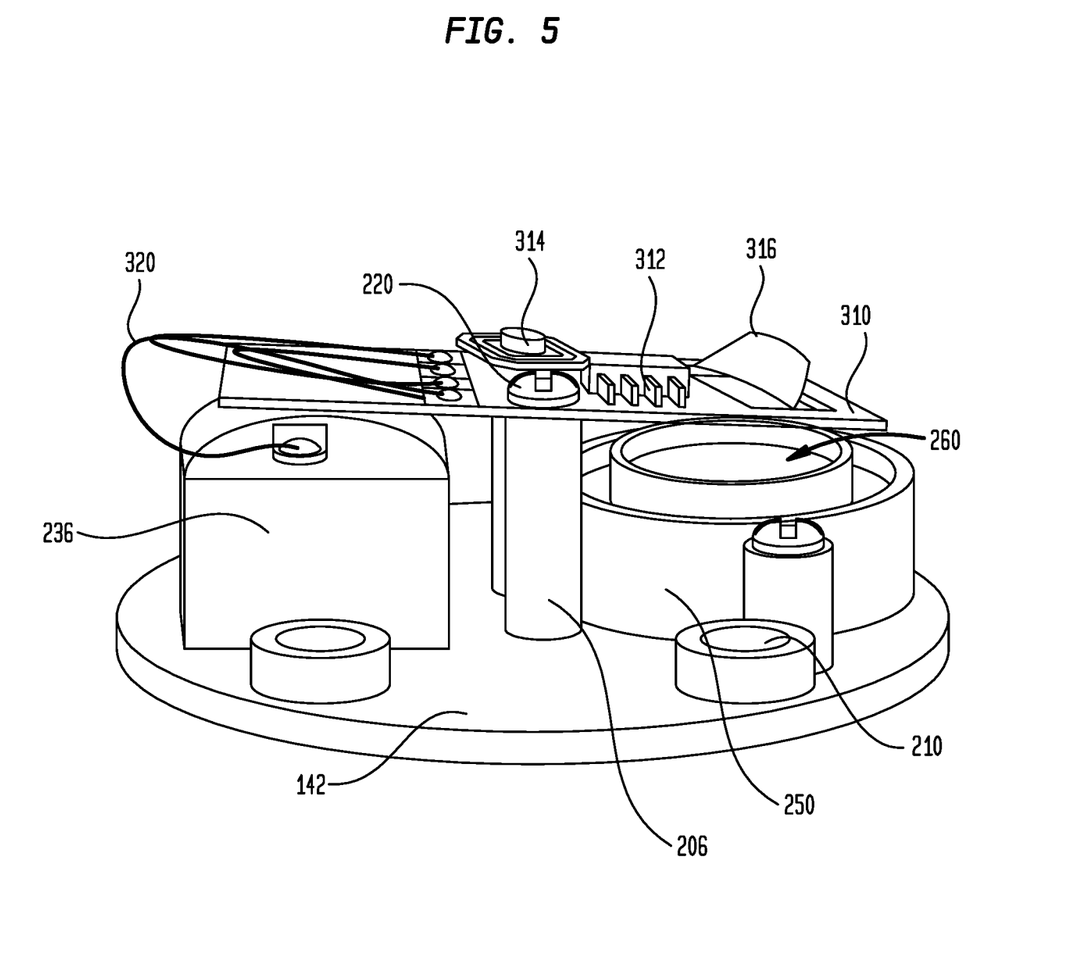
FIG. 5 is a side view of the assemblies shown in FIG. 4.

The top 120 and sidewall 160 form a housing assembly 100; the bottom 140 forms the bottom assembly 200, and the device further comprises a sound generating assembly 300 (FIGS. 3-4), which is attached to the bottom assembly 200, and each of which is described below.

The housing assembly 100 comprises a single piece of material 100, such as a piece of molded plastic formed as shown in FIG. 3B. In an alternate embodiment, the housing assembly could be made from one or more components, such as a sidewall and a top piece, which are then assembled to form the housing. In the embodiment shown in the drawings, the inner diameter of the housing assembly 100 is slightly larger than the outer diameter of the bottom assembly 200 and the sound generating assembly 300 so that the latter two fit within the housing assembly 100. One or more fasteners 220 attach the bottom 200 and sound generating 300 assemblies to the housing assembly 100 (FIG. 1).

A plurality of bushings 210 attached to the bottom inside surface 142 align with a plurality of top bushings 126, and each bushing receives a fastener 220 through their respective openings 212 and 128 to fasten the bottom assembly 200 and sound generating assembly 300 to the housing assembly 100 and assemble the sound generating device 10. One or more spacers 118 are attached to the top's inner surface 122 and extend almost to the end of the sidewall 160 beneath where the top 200 is positioned after it has been attached to the housing assembly 100. In alternate embodiments, the spacers could be formed as a part of the sidewall 160, or attached by a fastener, adhesive or other means of joining, to the bottom inside surface or to the inside of the sidewall.

Referring to FIG. 1, the housing assembly 100 includes a ridge 130 that extends past the top 120 to form a recess in which a game piece (500) is retained, keeping the game piece positioned on the device 10 and in position to touch and move the contact 134 disposed within the opening 132 in the top. The ridge may be absent in alternate embodiments of the sound generating device, and the top may be level with the sides; in other embodiments the top may extend above the sides, forming a raised platform on which to position a game piece.

FIG. 3B illustrates components of the housing 100, with a base plate 128 positioned proximate the inner surface 122 and several bushings 126 in which to mount and receive the bottom 200 and sound generating assembly 300. The contact 134 is moveable, and the contact upper surface 136 is disposed within opening 132. The contact lower surface 138, when the contact 134 is depressed, will contact receptacle 314 on the sound generating assembly, and communicate with the microprocessor/sound chip 312 to cause sound to be emitted.

The bottom 200 of the device includes a one or more spacers 206 onto which spacers 206 the sound generating assembly 300 is attached by means of a fastener 220. Note that while reference numeral 220 refers to a fastener, and the fastener is generally a screw, the screws shown in the drawings can be, and are of, different sizes.

Bottom 200 includes a cover 230 for a battery compartment 236, a plurality of openings 240 to allow sound from the speaker 260 to be heard, and a plurality of bottom bushings 210 through which a fastener 220, such as a screw, is positioned and used to connect the bottom assembly 200 with the housing assembly 100 (FIGS. 2-3). The slit 234 in the battery compartment cover 230 facilitates removal of the cover 230 when replacing the battery (not shown).

In the embodiment shown in the drawings, the device 10 has a circular configuration.

Alternative embodiments can have one or more different configurations, such as a triangle, square, rectangular, ellipsoid, pentagonal, hexagonal, septagonal, octagonal, nonagon, decagon and the like, or a combination thereof, the sides may be of equal or unequal length, and there can be some variation in the internal arrangement of the device's components.

In the embodiment shown in the drawings, the battery compartment 236 is sized to hold a size "N" battery, or could hold several "button" batteries (for example only, a type CR2025 lithium-ion battery), depending upon manufacturing concerns. If the sound generating device 10 is produced in a larger size, the battery compartment could be scaled up to hold other types of batteries, such as AA, AAA, C, D or other types of "button" batteries. Alternate embodiments of the present invention may include a rechargeable battery, and a port in either the housing or the bottom into which a battery charger could be inserted to charge the battery. Another alternative power source could include a solar cell, visible through an aperture in either the top or side of the device, or an adapter to power the sound generating device 10 using a conventional source of electricity appropriate to the country in which the sound box is being used, such as AC current in North America, or a Universal Serial Bus ("USB"), THUNDERBOLT® (Registered trademark of Apple, Inc., Cupertino, Calif. for computers, computer cables, computer hardware for data storage, and other goods and services) or LIGHTNING® connector (Registered trademark of Apple, Inc., Cupertino, Calif. for electrical and electronic connectors, cables . . . adapters for use with computers, . . . computer peripheral devices . . . and other digital data).

The battery compartment 236 is kept closed using a fastener 220, such as a screw. In other embodiments the cover 230 for the battery compartment 236 may not utilize a screw, and instead be closed by means of a press fit or sliding mechanism, or other comparable means known to those of ordinary skill in the art. Use of a screw-down battery compartment cover prevents the battery from being readily removed, a safety precaution to prevent possible injury to small children who might come in contact with the device and accidentally ingest a battery.

The bottom assembly 200 further comprises a battery compartment 236, a speaker 260, and a support 206 onto which the sound generating assembly 300 is mounted using a fastener 220.

A speaker retaining ring 250 is mounted to bottom inside surface 142, in this embodiment by a pair of fasteners 220. In alternate embodiments, the retaining ring 250 could be attached by means of an adhesive, or formed as a part of the bottom assembly 200, such as by molding. Similarly, the battery compartment 236 could be attached to bottom inside surface by an adhesive, or could be formed as a part of the bottom assembly 220 by molding. The speaker is a conventional speaker and obtained from commercial sources. The speaker 260 is positioned atop the retaining ring 250, and there is a space between the speaker 260 and the bottom inside surface 142, which in the bottom inside surface is perforated in the area that is beneath the speaker 260 and its retaining ring 250.

The sound generating assembly 300 comprises a printed circuit board ("PCB") 310 on which an microprocessor/sound chip 312, a switch 314, and a capacitor 316 are all electrically interconnected. The circuitry on the PCB 310 is in electrical communication with the battery compartment 236 and the speaker 260 by wiring 320 positioned so that the batteries can be permanently attached to the circuit board 310, or can be removed and replaced by the user. The printed circuit board 310 is mounted atop supports 206 by means of fasteners 220, but could also be mounted using an adhesive or other type of fastener. Wiring 320 that connects the printed circuit board 310 with the battery compartment 236 and speaker 260 is connected to PCB 310 at a plurality of terminals 318 on PCB 310. The attachment of wiring 320 to terminals 238 on battery compartment 236 can be seen in the drawings. The attachment of wiring 320 to the speaker is not shown; the connection is made by means known to those of ordinary skill in the art.

Figure 6:
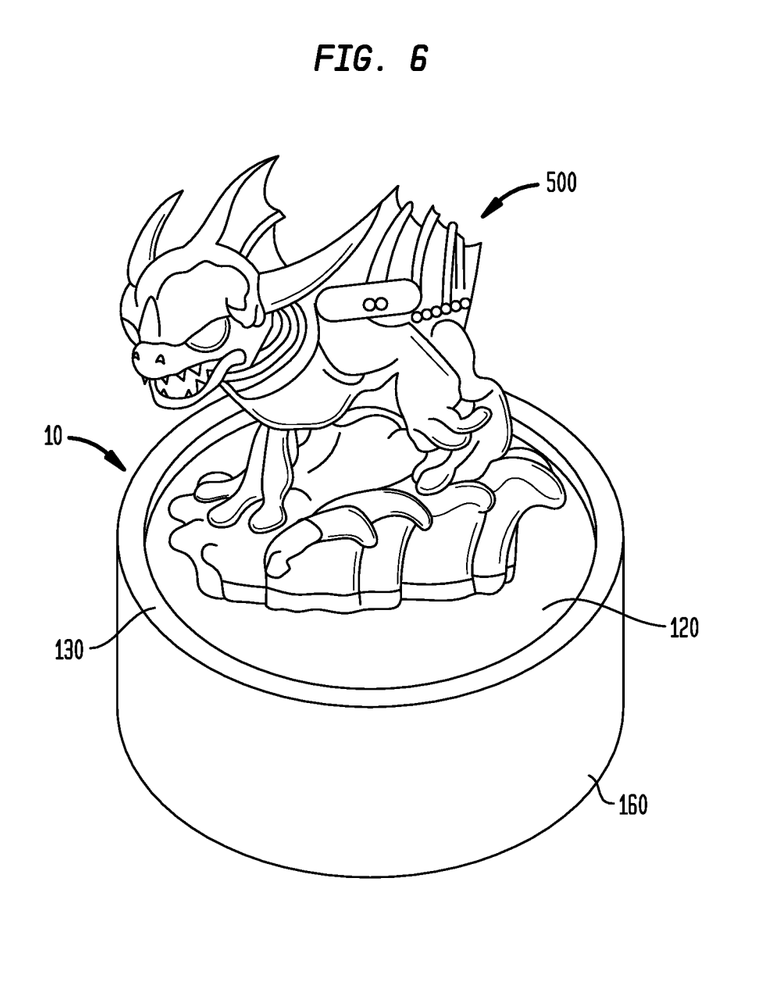
FIG. 6 is a top plan view of the embodiment of FIG. 1 with a toy (or game piece) on the device top.

In use, a game piece 500, such as a dragon (FIG. 6), is placed on top of the sound generating device 10, and the combined unit then struck onto a hard surface. When the device 10 strikes the hard surface, the game piece 500 strikes the contact 134, which then contacts the switch 314, sending a signal to the sound chip 312 to emit a sound, which is then broadcast through the speaker 260. The sound chip 312 has been programmed during manufacturing to emit a particular sound, for example, if the game piece is a dragon, a sound that would simulate a roar or similar sound that would be emanating from a "fire-breathing dragon". Military toys could be programmed to emit sounds appropriate to the character, whether a horse, an infantryman firing a weapon, a cannon sound, or the like. Examples of other game pieces that could be used include chess pieces, checkers, animals, military figures, military toys, trucks, aircraft, dolls, action figures, comic book characters, science fiction characters, motion picture characters, cartoon characters and the like. The sound recorded can range from animal and/or environmental sounds, music, congratulatory messages, other types of voice recordings, bells, whistles and the like, generally being limited thy the imagination of the individual preparing the recording. Some examples of sounds that may be played, not intended to be limitations, include a baby's cry, a cat's meow, a dog bark, "Happy Birthday", "Happy Anniversary", "Congratulations", a lion's roar, and a wolf's howl. Sound chips having different time periods for recording could also be utilized. In embodiments, the sound chip could be programmed to emit sound for a period ranging from about 1 second to about 30 seconds. In another embodiment, the sound chip could be programmed to emit sound for a period ranging from about 0.5 seconds to about 25 seconds. In other embodiments, the sound chip could be programmed to emit sound for a period ranging from about 1 second to about 20 seconds. In another embodiment, the sound chip could be programmed to emit sound for a period ranging from about 2 seconds to about 15 seconds.

In alternate embodiments, the PCB 310 may include an antenna to receive signals by means of WiFi, radio frequency, near field communication, or infrared, to program the sound chip 312 from a remote source, such as a computer, a cellular telephone, a smartphone, or other type of communication device currently extant or to be developed in the future. An application ("app") for a smartphone is one potential way of communicating with the sound chip 312.

One or more alternative power sources 418, could also be provided, either as a substitute for, or supplement to, the batteries 418. These alternative power sources cold include a solar cell or an adapter to power the sound module 400 using a conventional source of electricity appropriate to the country in which the sound box is being used, such as AC current in North America.

A solar cell could be mounted on either the top surface, or visible through either the top surface or side of the device through an opening or window cut into the top surface or device side, and the solar cell wired into electrical communication with the microprocessor and electronics of the sound generating device.

Figure 7:
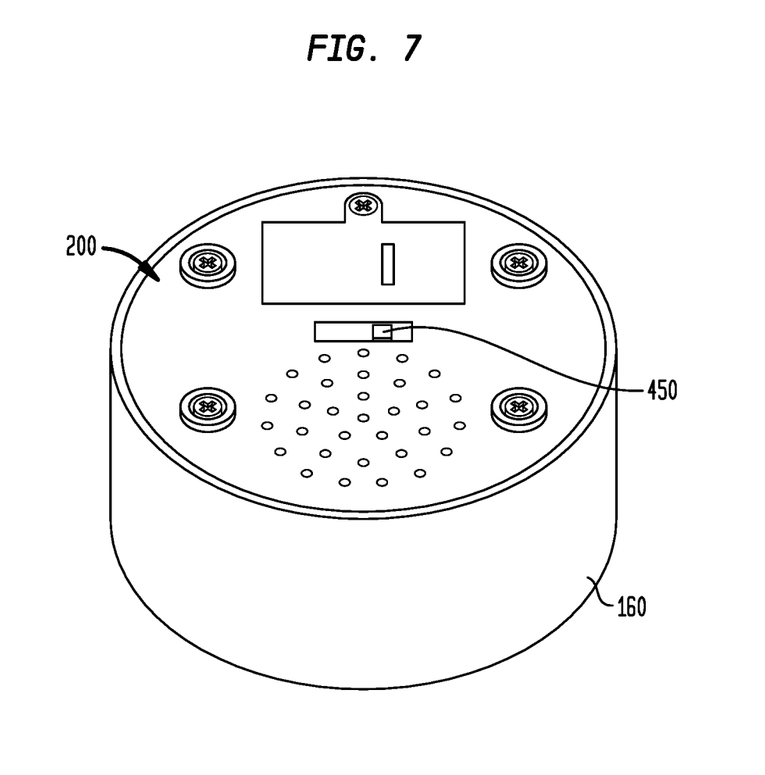
FIG. 7 shows an alternate embodiment of the present invention, containing an on-off switch.

Another embodiment of the present invention (FIG. 7) includes an on-off switch 450 mounted within the bottom assembly 200 and in electrical communication with the battery compartment 236 by conventional means of wiring (not shown). Use of the on-off switch 450 serves to extend battery life. This alternate embodiment may or may not include the contact 134 mounted within device top 120.

Although embodiments of this invention have been described with a certain degree of particularity, it is to be understood that the present disclosure has been made only by the way of illustration, and that numerous changes in construction and arrangement of parts may be resorted to without departing from the spirit and scope of the invention.

I claim:

1. A sound generating device, the device comprising:
a housing, the housing comprising a top and a sidewall;
the top having an inner surface and an outer surface,
the top having an opening therethrough,
a base plate positioned proximate to the inner surface; and
a moveable contact having an upper surface and a lower surface,
the moveable contact retained by and extending through the base plate and into the top opening,
the moveable contact lower surface being larger than the moveable contact upper surface; the moveable contact lower surface to be positioned near a sound generating assembly;
a bottom;
the bottom including a plurality of apertures, a battery compartment attached to the bottom, the battery compartment including a moveable cover, the moveable cover forming an opening in the bottom; and
a sound generating assembly, the assembly connected to the bottom, the assembly comprising:
a printed circuit board, a microprocessor, a sound chip, a capacitor, a speaker and a power source, a receptor for receiving the moveable contact lower surface;
the speaker positioned to emit sound through the device bottom;
the sound generating assembly in electronic communication with the battery compartment; and
the bottom and housing attached to each other by a means for fastening;
whereby when the moveable contact upper surface is struck, the moveable contact is depressed and the moveable contact lower surface contacts the sound generating assembly receptor and communicates with the microprocessor to signal the sound chip to emit a sound programmed therein.

2. The sound generating device as described in claim 1, wherein the sidewall extends past the top outer surface, forming a ridge and defining a recess therein in which to retain an additional component.

3. The sound generating device as described in claim 2, wherein the additional component is a game piece.

4. The sound generating device as described in claim 3, wherein the sound generated is a sound that is representative of the game piece.

5. The sound generating device as described in claim 4, wherein the sound generated is selected from one or more of the group consisting of Happy Birthday, Happy Anniversary, congratulations, animal sounds, environmental sounds, a cat's meow, a dog's bark, a lion's roar, a wolfs howl, cannon firing, horse galloping, bells, whistles, aircraft engine sounds, train whistles, "gotcha", and "attack".

6. The sound generating device as described in claim 5, wherein the sound generated is selected from one or more of the group consisting of Happy Birthday, Happy Anniversary, congratulations or other type of congratulatory message.

7. The sound generating device as described in claim 3, wherein the game piece is a game piece selected from the group consisting of chess pieces, checkers, animals, military figures, military toys, automobiles, trucks, aircraft, dolls and action figures.

8. The sound generating device as described in claim 2, wherein the duration of the sound ranges from about 0.5 seconds to about 30 seconds.

9. The sound generating device as described in claim 8, wherein the duration of the sound ranges from about 1 second to about 20 seconds.

10. The sound generating device as described in claim 9, wherein the duration of the sound ranges from about 2 seconds to about 15 seconds.

11. The sound generating device as described in claim 2, further comprising an on-off switch, the on-off switch in electrical communication with the battery and sound generating assembly.

12. The sound generating device as described in claim 1, wherein the top outer surface is level with the sidewall.

13. The sound generating device as described in claim 1, wherein the top outer surface further comprises a raised section, the raised section forming a region on the top outer surface on which to retain the additional component.

14. The sound generating device as described in claim 2, wherein the device has a configuration selected from one or more of the group consisting of triangular, circular, square, rectangular, ellipsoid, pentagonal, hexagonal, septagonal, octagonal, nonagonal, decagonal or a combination thereof.

15. The sound generating device as described in claim 14, wherein the device has a circular configuration.

16. The sound generating device as described in claim 2, wherein the battery is a rechargeable battery, and the device further comprises a port for connection to a battery charger.

17. The sound generating device as described in claim 2, wherein the housing further comprises an aperture, and the device further comprises a solar cell, the solar cell accessible through the housing aperture, and the solar cell in electrical communication with the battery.

18. A sound generating device, the device comprising:
a housing, the housing comprising a top and a sidewall;
the top having an inner surface and an outer surface,
  the top having an opening therethrough,
    a base plate positioned proximate to the inner surface; and
    a moveable contact having an upper surface and a lower surface,
      the moveable contact retained by and extending through the base plate and into the top opening,
      the moveable contact lower surface being larger than the moveable contact upper surface; the moveable contact lower surface to be positioned near a sound generating assembly;
    the sidewall extending past the top outer surface, forming a ridge and defining a recess therein in which to retain a game piece;
a bottom;
the bottom including a plurality of apertures, a battery compartment attached to the bottom, the battery compartment including a moveable cover, the moveable cover forming an opening in the bottom; and
a sound generating assembly, the assembly connected to the bottom, the assembly comprising:
  a printed circuit board, a microprocessor, a sound chip, a capacitor, a speaker and a power source, a receptor for receiving the moveable contact lower surface;
  the speaker positioned to emit sound through the device bottom;
  the sound generating assembly in electronic communication with the battery compartment; and
  the bottom and housing attached to each other by a means for fastening;
  whereby when the moveable contact upper surface is struck, the moveable contact is depressed and the moveable contact lower surface contacts the sound generating assembly receptor and communicates with the microprocessor to signal the sound chip to emit a sound programmed therein, and the duration of the sound ranges from about 0.5 seconds to about 30 seconds.

19. The sound generating device as described in claim 18, wherein the game piece is a game piece selected from the group consisting of chess pieces, checkers, animals, military figures, military toys, automobiles, trucks, aircraft, dolls, and action figures.

20. The sound generating device as described in claim 18, further comprising an on-off switch, the on-off switch in electrical communication with the battery and sound generating assembly.

* * * * *